United States Patent [19]

Ramsbottom

[11] Patent Number: 5,208,123
[45] Date of Patent: May 4, 1993

[54] HOLOGRAM CONSTRUCTION

[75] Inventor: Andrew P. Ramsbottom, Bolton, United Kingdom

[73] Assignee: Pilkington P.E. Limited, United Kingdom

[21] Appl. No.: 524,656

[22] Filed: May 17, 1990

[30] Foreign Application Priority Data

May 18, 1989 [GB] United Kingdom ............ 89/11454

[51] Int. Cl.$^5$ .................... G03H 1/04; G03H 1/02
[52] U.S. Cl. ........................................ 430/1; 430/2; 359/1; 359/9
[58] Field of Search ............ 430/1, 2; 350/3.67, 350/3.75, 3.73, 3.66, 3.6; 359/1, 9, 10, 20, 22

[56] References Cited

U.S. PATENT DOCUMENTS

| 3,650,605 | 3/1972 | Little, Jr. ............... | 359/35 |
| 3,698,010 | 10/1972 | Lee ........................ | 359/21 |
| 3,829,838 | 8/1974 | Lewis et al. ............. | 350/3.75 |
| 4,395,088 | 7/1983 | Firth et al. .............. | 359/15 |
| 4,493,990 | 1/1985 | Koszytorz et al. ......... | 350/6.5 |
| 4,895,419 | 1/1990 | Doyle et al. ............. | 359/12 |

FOREIGN PATENT DOCUMENTS

| 1090630 | 12/1980 | Canada ...................... | 430/2 |
| 04155 | 7/1986 | European Pat. Off. . | |
| 1212559 | 11/1970 | United Kingdom . | |
| 2159979A | 9/1987 | United Kingdom . | |

OTHER PUBLICATIONS

Fukaya, T. et al. "Holographic properties of Chalcogenide-metal Photosensitive Materials" Opt. Comm. 7, 98-102 (1973).

Primary Examiner—Charles L. Bowers, Jr.
Assistant Examiner—Martin Angebranndt
Attorney, Agent, or Firm—F. Eugene Davis, IV

[57] ABSTRACT

The method involves directing first and second separate illuminating beams towards a photosensitive film from separate fixed apparent beam source positions respectively in such a manner that the beams are caused to overlap at the point of incidence at the photosensitive film. Stationary interference fringes are generated and the beams are caused to scan in a raster type pattern over the photosensitive film in such a manner whereby overlapping of the beams is maintained throughout the exposure of the film. The apparatus in one embodiment involves the generation of a third illuminating beam which is used to control means to control an associated scanner to effect synchronised movement of the second beam with the first beam. A further embodiment involves memorising the scanning movement of beam in a memory and using the memorised scanning pattern to control the scanner to maintain beam overlap.

10 Claims, 2 Drawing Sheets

HOLOGRAM CONSTRUCTION

BACKGROUND OF THE INVENTION

The present invention relates to hologram construction and more particularly to a method and apparatus for constructing holograms and holograms made by use of such method and apparatus.

In a known conventional method of transmission hologram construction a single beam of radiation emanating from a single beam source (usually a laser) is split into two separate expanded beams (object and reference beams) of radiation.

The two separate beams, which are conveniently of roughly equal intensity, are combined at the hologram plate which causes high contrast interference fringes to be generated in the region of overlap of the beams at the hologram plate. These fringes may be recorded on a suitable photosensitive material or film (e.g. dichromated gelatin photoresist, silver halide), overlapping the plate, by development and processing of the film. This constitutes the hologram.

This method of construction of holograms suffers from a number of practical problems including a) instability of the system and b) lack of hologram uniformity. Concerning a), it is known that any transitional shift in the relative paths lengths of the two beams during exposure of the photosensitive film has the effect of shifting the interference fringes with the consequence of loss of definition of the recorded fringe pattern, or at the worst, complete loss of the hologram.

Such interference fringe shifts may be caused by vibration within the optical system, the effects of movement of the air in the system, the effects of heating of the system and so on. The effect on the recorded fringe pattern in these circumstances is generally proportional to the duration of exposure of the hologram.

It is possible to minimise these effects by avoiding long beam path lengths, enclosing the system in order to prevent movement of air, using powerful laser beams to reduce hologram exposure times and so on. However, such steps may prove expensive and may not always be entirely successful, especially for the exposure of large area holograms and for photosensitive materials having low sensitivity e.g. dichromated gelatin photoresist, or photopolymers.

Regarding b), it will be apparent that the laser beam intensity profile may take a number of different forms, the precise form depending on the operating mode of the laser and it is known that it is not easy to achieve a uniform exposure of the hologram over the hologram aperture with any of these modes. A solution which is normally adopted, however, is to use the central portion of the Guassian beam intensity profile of a TEMoo mode of the laser.

It has been found, however, that employing this solution, complete uniformity of exposure is not achieved, and indeed because of considerable energy loss in the outer portion of the beam, longer exposure times are required.

An aim of this invention is to provide a method and apparatus for constructing holograms which substantially reduce the effects of the aforementioned problems.

SUMMARY OF THE INVENTION

According to this invention there is provided a method of constructing a hologram including the steps of directing at least first and second separate illuminating beams towards a photosensitive film from separate independent substantially fixed apparent beam source positions respectively, overlapping the first and second illuminating beams where they are incident at the photosensitive film, generating stationary interference fringes in the region of the overlapping beams and moving the first and second illuminating beams relative to the photosensitive film in a manner which maintains said overlapping throughout exposure of the photosensitive film to record the stationary interference fringes.

The first and second illuminating beam movement relative to the photosensitive film is desirably a pattern of movement such as a scanning movement which is preferably a raster scanning movement.

Scanning movement of the first and second illuminating beams may be effected by separate single point scanning devices positioned at said substantially fixed apparent beam source positions respectively, the separate scanning devices being controlled by scanning information from respective independent control means.

According to a first embodiment of this invention the method further comprises superimposing a third illuminating beam upon the first illuminating beam at a point in the first illuminating beam whereby the third illuminating beam path is coincident with the first illuminating beam path and the third illuminating beam follows the pattern of movement of the first illuminating beam exactly.

According to this embodiment, the method further comprises scattering light from the third illuminating beam where it is incident at the photosensitive film and imaging a proportion of the scattered light by way of the single point scanning device related to the second illuminating beam towards a detection means which is adapted to provide scanning information concerning the pattern of movement of the proportion of scattered light from the third illuminating beam.

According to this embodiment the method further comprises controlling the independent control means associated with the second illuminating beam with said scanning information from the detection means to move the singe point scanning device related to the second illuminating beam in a pattern of movement which tracks the proportion of scattered light from the third illuminating beam and thereby maintain the overlap of the second and first illuminating beams.

The wavelength of the third illuminating beam is preferably 633 nm and is non-actinic in order not to expose the photosensitive film.

In a second embodiment of this invention involving first and second stages in a two stage sequence, the method comprises preventing the second illuminating beam imaging through the related single point scanning device, replacing the photosensitive film with a light scattering means, scattering light from the first illuminating beam where it is incident at the light scattering means and imaging a portion of the scattered light by way of the single pint scanning device related to the second illuminating beam on to a detector means which is adapted to provide information concerning the pattern of movement of the proportion of scattered light from the first illuminating beam, controlling the independent control means associated with the second illuminating beam with scanning information from the detector means to move the single point scanning device related to the second illuminating beam to track the pattern of movement of the proportion of the scattered light from the first illuminating beam and memorising this scanning information together with scanning information from the independent control means associated with the single point scanning device related to the first illuminating beam.

According to the second stage of this second embodiment the method further comprises imaging the second illuminating beam through the related scanning device, replacing the light scattering means with the photosensitive film and using the respective memorised scanning information concurrently to control the pattern of movement of the respective single point scanning devices to thereby maintain the overlap of the second and first illuminating beams.

The illuminating beams are preferably laser beams.

The present invention further provides apparatus for constructing a hologram, the apparatus comprising at least one light emitter, beam splitting means for directing light emanating from said at least one light emitter into first and second separate illuminating beams, two separate moveable optical, preferably reflection, means which are arranged for directing the first and second illuminating beams from apparent beam source positions respectively towards a photosensitive film, and independent control means for controlling movement of the moveable optical means respectively, whereby the first and second separate illuminating beams are directed towards the two separate moveable optical means respectively and therefrom towards the photosensitive film where it is arranged that the beams overlap at the point where they are incident at the photosensitive film to thereby generate stationary interference fringes and the independent control means are adapted to move the first and second illuminating beams respectively relative to the photosensitive film in a manner which maintains said overlap throughout exposure of the photosensitive film to record the stationary interference fringes.

The moveable optical, preferably reflection, means are preferably constituted by single point scanning devices which are arranged to move the first and second illuminating beams respectively relative to the photosensitive film in a scanning movement which is preferably of the raster type.

Preferably scanning information for controlling movement of the single point scanning devices is provided by the independent control means respectively.

Apparatus according to a first embodiment of this invention preferably comprises a further light emitter and a first wavelength filter means positioned in the path of the first illuminating beam between the beam-splitting means and the single point scanning means related to the first illuminating beam, whereby the further light emitter produces a third illuminating beam at a wavelength of preferably 633 nm which is non-actinic, whereby the third illuminating beam is superimposed upon the first illuminating beam by way of the first wavelength filter means such that the third illuminating beam follows the pattern of movement of the first illuminating beam exactly.

Apparatus according to this embodiment further preferably comprises a second wavelength filter means positioned in the path of the second illuminating beam between the beam splitting means and the single point scanning device related to the second illuminating beam and a detector means which provides scanning information, whereby a proportion of the scattered light from the third illuminating beam which is scattered where it is incident at the photosensitive film is imaged by way of the single point scanning device related to the second illuminating beam on to the detector means by way of the second wavelength filter means and the scanning information, provided by the detector means, is concerned with the pattern of movement of the proportion of scattered light from the third illuminating beam.

Preferably the independent control means associated with the second illuminating beam is controlled by the scanning information from the detection means to move the single point scanning device related to the second illuminating beam in a pattern of movement which tracks the portion of the scattered light from the third illuminating beam to maintain the overlap of the second and first illuminating beams.

In a second embodiment of this invention involving first and second stages in a two stage operating sequence, the apparatus comprises in the first stage, operating means, which may be mechanical or electromechanical, for a) replacing the photosensitive film with a light scattering means which is preferably a diffuse scattering plate, b) positioning a beam stop to obstruct the second illuminating beam to prevent imaging of this beam through the related scanning device and, c) replacing the second wavelength filter means with a fixed reflection means, which may be a plane mirror, and data storage means, which may include associated processing control apparatus, whereby light from the first illuminating beam is scattered where it is incident at the light scattering means and a proportion of the scattered light is imaged by way of the single point scanning device related to the second illuminating beam on to the detector means which is adapted to provide information concerning the pattern of movement of the proportion of the scattered light from the first illuminating beam, and the independent control means associated with the second illuminating beam is controlled by means of scanning information from the detector means to move the single point scanning device related to the second illuminating beam to track the pattern of movement of the position of the scattered light from the first illuminating beam and to memorise this scanning information together with scanning information from the independent control means associated with the single point scanning device related to the first illuminating beam in the storage means.

According to the second stage of this second embodiment, the said operating means a) effects replacement of the light scattering means with the photosensitive film, b) removes the beam stop from the second illuminating beam and c) removes the fixed reflection means from the second illuminating beam effectively switching the detector means out of use, whereby data signals representing the respective memorised scanning information are directed concurrently to the respective independent control means respectively to control the pattern or movement of the respective single point scanning devices to maintain the overlap of the second and first illuminating beams.

The light emitters are preferably lasers.

The invention provides either a reflection hologram or a transmission hologram made by a method and/or by use of apparatus as set forth above.

The invention will be more readily understood from the following description of two exemplary embodiments which should be read in conjunction with the accompanying drawings in which:

DESCRIPTION OF PREFERRED EMBODIMENTS

A method for the construction of reflection holograms using a 'fixed source' scanning arrangement is disclosed in GB patent No. 2159979 where a single front surface scanning mirror is angularly moveable about two orthogonal axes of rotation which lie in the plane of the mirror and intersect at a point where light providing the illuminating beam is reflected from the mirror. The incident light is focussed onto the mirror at this point so that the illuminating beam for the hologram construction always appears to diverge from it. That point therefore constitutes a substantially fixed apparent beam source position which remains stationary relative to the film over which the beam is scanned.

Figure 1:
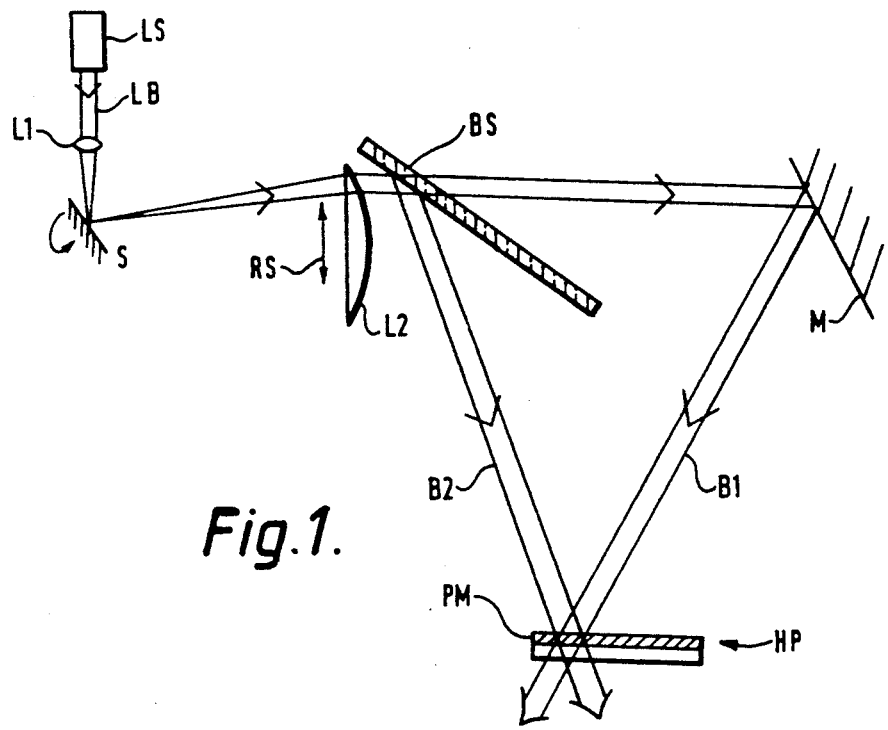
FIG. 1 is a schematic diagram of a scanning system for constructing transmission holograms in which two separate illuminating scanning beams, emanating from a single substantially fixed apparent beam source, are directed towards a photosensitive film.

The principle of fixed source scanning is also applicable to the construction of transmission holograms as shown applied to a conventional two-beam exposure system as shown in FIG. 1. In this system, a diffraction limited laser beam LB emanating from a laser LS is focussed by means of a lens L1 on to a single point scanning device S including a reflection means in the form of a scanning mirror (see patent GB 2159979 for type of scanner which is suitable) which provides for a raster type scanning RS movement of the beam across a lens L2 and beamsplitter BS.

The scanning beam is split into two separate beams B1, the object beam, and B2, the reference beam and both beams are directed (beam B1 being reflected by plane mirror M) towards a hologram plate HP which carries a photosensitive film PM, where they are combined, i.e. overlap. Interference fringes are formed at the region of overlap and these are recorded by the film.

It should be appreciated that while it may not be possible to overlap the object and reference beams to the extent that they are coincident, to obtain a good quality hologram this optimum condition is aimed for. Usually an overlap of the object and reference beams of 50% or greater will provide a good quality hologram.

Due to the single point nature of the scanning technique, relatively no shift in interference fringes occurs during the scan as each point on the hologram receives radiation from the same two directions and with the same phase difference. In addition, each point on the hologram is exposed with a powerful laser beam for only a short period of time, as a consequence of which the system is far less susceptible to instability problems, especially those which would be due to longer term drifts e.g. movement of air and thermal effects. Furthermore, each point on the hologram should receive the same amount of exposure thereby improving uniformity of exposure.

The main restriction on the use of a two-beam scanning arrangement as outlined above, is the requirement for there to be significant overlap of the two beams at the hologram plate at all points over the hologram aperture. For the system shown in FIG. 1, this may be satisfied providing the object beam B1 and the reference beam B2 are maintained incident at equal angles to the hologram plate.

In this simple arrangement disclosed above this may not always be possible, especially if more complicated optical construction beams are employed and the requirement of beam overlap is not generally satisfied at all points over the hologram aperture. Optical systems to provide a scan rate correction may be envisaged, however these are likely to become extremely complex and impracticable for all but the simplest hologram geometrics.

The techniques proposed by the present invention provide a solution to the problem of beam overlap enabling the application of a two-beam scanning technique to a generalised two-beam hologram configuration.

Referring to the drawings (FIG. 2, FIG. 3 and FIG. 4), briefly each beam (object B1 and reference B2) originates from a substantially fixed apparent beam source in the form of an independent single point scanning device (S1 and S2) of the type disclosed in patent GB 2159979 which incorporates a moveable reflection means in the form of a mirror in the manner previously explained. One of the scanning devices S1 is arranged to perform a conventional raster scanning movement RS of one of the beams through construction optics O1 on to the hologram plate HP while the other scanning device S2 is arranged to be synchronised with the scanning pattern generated at the hologram plate by the object beam B1.

In this manner, although the scanning pattern may have become distorted by the construction optics O1, the reference beam B2 will follow the distorted pattern exactly, e.g. it will automatically track the pattern by way of optics O2, regardless of however complex it is, so that an overlap of the beams is maintained at all points over the hologram aperture.

Figure 2:
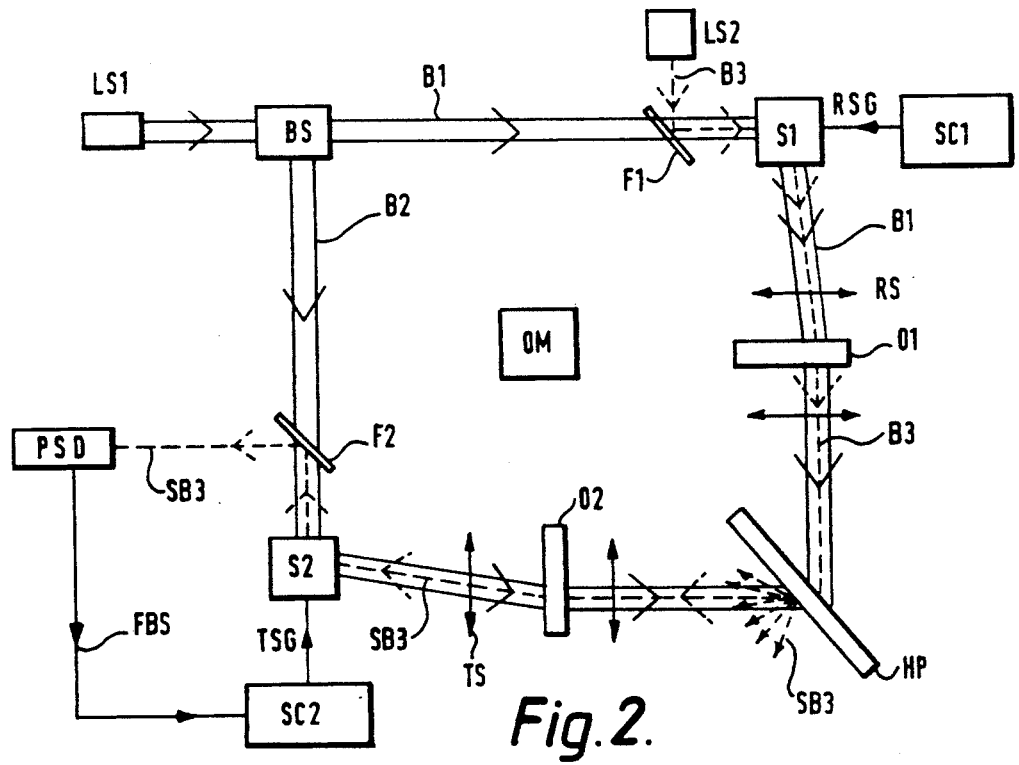
FIG. 2 is a schematic diagram of one scanning system for constructing reflection holograms according to this invention in which two separate illuminating scanning beams, which emanate from two separate substantially fixed apparent beam sources respectively, are directed towards a photosensitive film.
Figure 3:
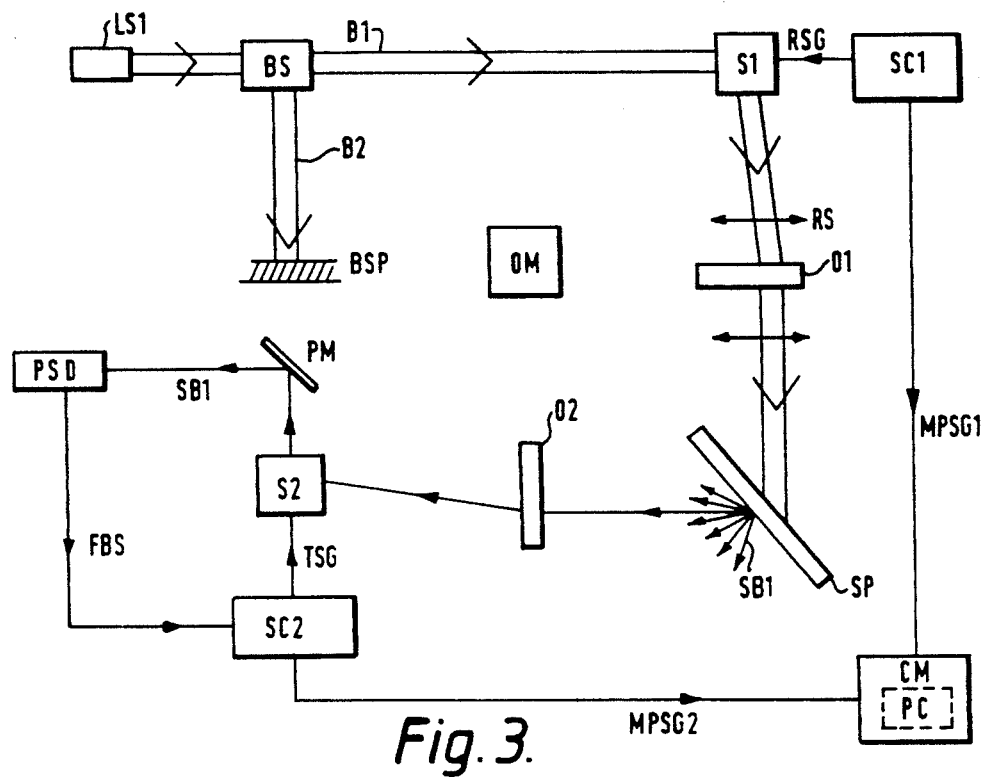
FIG. 3 is a schematic diagram showing a first stage of another scanning system for constructing reflection holograms according to this invention; and, FIG. 4 is a schematic diagram showing a second stage of the system shown in FIG. 3 which includes beam arrangements as shown in FIG. 2 and which are under the control of a storage device which has been programmed for operation during the first stage as shown in FIG. 3.
Figure 4:
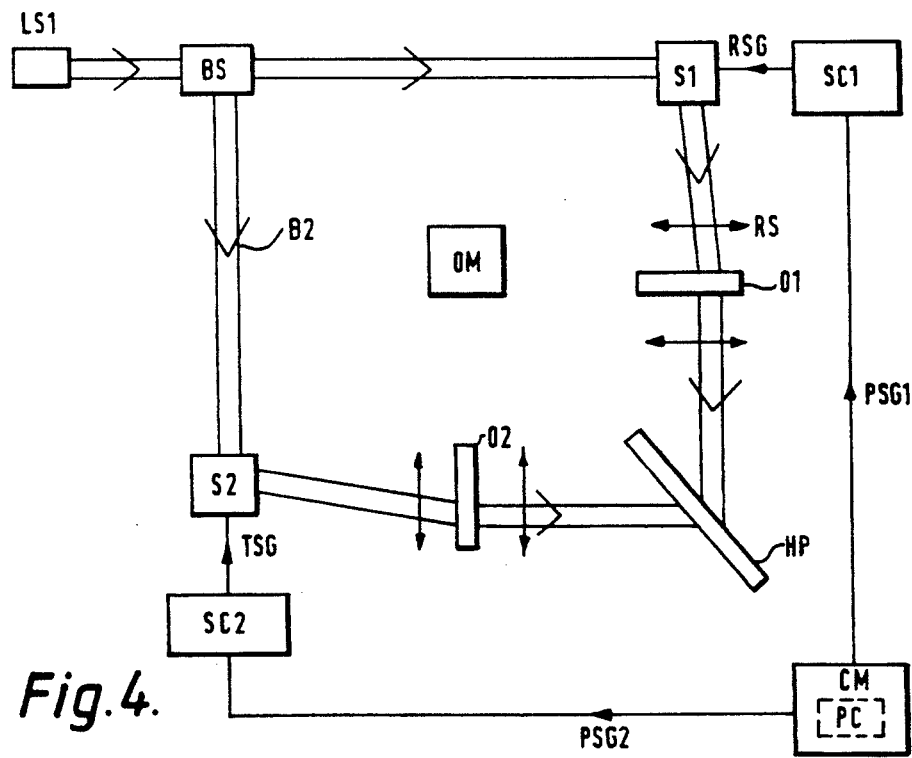

Consideration will now be given in more detail to two exemplary embodiments of this invention with reference to FIG. 2, FIG. 3 and FIG. 4 showing arrangements for the construction of reflection holograms. Referring firstly to FIG. 2, this arrangement may be termed a "real time tracking" system as it is arranged for one of the scanning devices to automatically "lock-on" to the scanning pattern of the other. The input beam from a light emitter in the form of a laser LS1 is split into two separate beams B1 and B2 by a beam splitter BS and each beam is directed to an accurately aligned and focussed single point scanning device S1 and S2 respectively.

It is arranged that each scanner moves its respective beam in a raster type scanning pattern RS on to the hologram recording plate HP through respective optics O1 and O2 whereby the beams overlap at the hologram plate HP where stationary interference fringes are generated and recorded by a photosensitive film of the plate.

The optics O1 and O2 are appropriate to the holographic optical element to be recorded and generally may be of a complicated arbitrary nature causing distortion of the raster scanning patterns. However, in order to maintain overlap of the beams at all points over the hologram aperture a third beam B3 emanating from a light emitter in the form of a laser LS2 is superimposed on to beam B1 by way of a wavelength filter F1 so that both beam paths are coincident. Accordingly the third beam B3 is subjected to a raster scanning movement by scanning device S1 which is controlled by a raster scanning signal RSG emanating from an independent control means hereafter referred to as scanning control means SC1.

Beam B3 is at a different wavelength $\lambda b$ to that of the exposure wavelength $\lambda a$ of beams B1 and B2, and is non-actinic (i.e. it will not expose the hologram). The wavelength $\lambda b$ is typically 633 nm when using dichromated gelatin as the photosensitive film.

At the hologram plate HP a proportion of beam B3 is scattered as indicated by the designation SB3 and a small proportion of this scattered light SB3 is directed by way of optics O2 and imaged through the scanning device S2 onto a wavelength filter F2 where the beam B3 is picked-off and directed to a position sensitive detector PSD for detection.

The output of the position sensitive detector PSD is directed to a further independent control means hereafter referred to as scanning control means SC2 as a feedback signal FBS which thereby controls through a tracking signal TSG the movement of the scanning device S2, ensuring that it follows or tracks the scattered light SB3 from the hologram. Since scanning device S2 is simultaneously directing beam B2 onto the hologram as a tracking scan TS, beam B2 will always overlap beams B1 and B3 throughout the exposure process.

Referring now to FIG. 3 and FIG. 4, this arrangement may be termed a "memorised scan" system. This system is arranged to operate in two sequential stages, stage 1 where the scanning patterns are memorised and stage 2 where the memorised scanning patterns are "played-back" to control both the scanning devices to record the hologram.

The construction of the system is substantially the same as that shown in FIG. 2 and corresponding components are similarly designated. A major difference, however, is the inclusion of a data storage or memory means CM which may include associated processing control apparatus PC which enables the storage and manipulation of the data signals representing the scanning patterns from both scanning control means SC1 and SC2.

In the first stage of this arrangement beam B2 is suitably obstructed by means of an appropriately positioned beam stop BSP to prevent the illumination beam B2 being imaged through the related scanning device S2, and a plane mirror PM is substituted in the position occupied in the FIG. 2 embodiment by the wavelength filter F2. In addition, the position normally occupied by the hologram plate is occupied by a diffuse scattering plate SP. The positioning of the beam stop BSP, the plane mirror PM and the diffuse scattering plate SP may be effected by operating means OM located at the appropriate parts of the apparatus. The operating means OM may for example be mechanically or electromechanically activated.

In operation light scattered (designated SB1) from beam B1 as a consequence of meeting the plate SP is imaged, by way of the optics O2, scanning device S2 and plane mirror PM, on to a position sensitive detector PSD and in the manner employed in the arrangement of FIG. 2, the output is directed to the scanning control means SC2 as a feedback signal FBS to control the movement of the scanning device S2 by means of the tracking signal TSG to follow or track the scattered light SB1.

During this operation, the scanning signals which are controlling both scanning devices S1 and S2 are directed as signals MPSG1 and MPSG2 respectively to be memorised in the storage means CM.

It should be noted that the scanning speed may be reduced to a rate sufficient to eliminate any tracking errors or other practical limitations of the tracking system during this stage of the sequence.

For stage 2 of the sequence (shown in FIG. 4), the scattering plate SP is replaced by a hologram plate HP in which a hologram is to be recorded. The beam stop BSP and the plane mirror PM are removed and the beam B2 directed onto the scanning device S2. By the removal of plane mirror PM, the position signal detector PSG is effectively switched-out of use.

In order to record the hologram, the storage means CM is arranged to send position data signals PSG1 and PSG2 representing the stored scanning patterns to the scanning control means SC1 and SC2 respectively. The raster scanning signal RSG and the tracking signal TSG now control the movement of the scanning devices S1 and S2 respectively ensuring that beams B1 and B2 will always overlap throughout the exposure process.

Stage 1 of the sequence need only be performed once for any given optical arrangement in order to perform and track the scanning patterns. Stage 2 is then performed for each and every other hologram recording with this given optical arrangement.

It will be appreciated by those skilled in the art that while the exemplary embodiments of this invention are concerned with the construction of reflection type holograms where the illuminating beams are directed towards the hologram plate from opposite sides, transmission type holograms may be readily constructed using the principles of this invention by rearranging the illuminating beam geometrics so that the illuminating beams are directed towards the hologram plate from one side only.

What is claimed is:

1. A method of constructing a hologram including the steps of;

directing at least first and second separate illuminating beams towards a photosensitive film from separate independent substantially fixed apparent beam source positions respectively;

overlapping the first and second illuminating beams where they are incident at the photosensitive film;

generating stationary interference fringes in the region of the overlapping beams; and, moving the first and second illuminating beams relative to the photosensitive film in a manner which maintains said overlapping throughout exposure of the photosensitive film to record the stationary interference fringes and to form a hologram of substantially larger area than said overlapping beams.

2. A method as claimed in claim 1, wherein the first and second illuminating beam movement relative to the photosensitive film is a pattern of movement such as a scanning movement.

3. A method as claimed in claim 2, wherein the scanning movement of the first and second illuminating beams is effected by separate single point scanning devices positioned at said substantially fixed apparent beam source positions respectively.

4. A method as claimed in claim 3, wherein the separate single point scanning devices are controlled by scanning information from respective independent control means.

5. A method as claimed in claim 4, including the step of:

superimposing a third illumination beam upon the first illuminating beam at a point in the first illuminating beam, the third illuminating beam being of a different wavelength from the wavelength of the first beam and having a beam path which is coincident with the first illuminating beam path whereby the third illuminating beam follows the pattern of movement of the first illuminating beam exactly.

6. A method as claimed in claim 5 including the step of;

scattering light from the third illuminating beam where it is incident at the photosensitive film and imaging a proportion of the scattered light by way of the single point scanning device related to the second illuminating beam towards a detection means which is adapted to provide scanning information concerning the pattern of movement of the proportion of scattered light from the third illuminating beam.

7. A method as claimed in claim 6 including the step of;

controlling the independent control means associated with the second illuminating beam with said scanning information from the detection means to move the single point scanning device related to the second illuminating beam in a pattern of movement which tracks the proportion of scattered light from the third illuminating beam and thereby maintain the overlap of the second and first illuminating beams.

8. A method as claimed in claim 5, wherein the wavelength of the third illuminating beam is 633 nm and is non-actinic in order not to expose the photosensitive film.

9. A method as claimed in claim 4, involving first and second stages in a two stage sequence, the method including in the first stage the steps of;

preventing the second illuminating beam imaging through the related single point scanning device;

replacing the photosensitive film with a light scattering means;

scattering light from the first illuminating beam where it is incident at the light scattering means and imaging a portion of the scattered light by way of the single point scanning device related to the second illuminating beam on to a detector means which is adapted to provide information concerning the pattern of movement of the proportion of scattered light from the first illuminating beam;

controlling the independent control means associated with the second illuminating beam with scanning information from the detector means to move the single point scanning device related to the second illuminating beam to track the pattern of movement of the proportion of the scattered light from the first illuminating beam; and, memorising this scanning information together with scanning information from the independent control means associated with the single point scanning device related to the first illuminating beam.

10. A method as claimed in claim 9 including the steps in the second stage of;

imaging the second illuminating beam through the related scanning device;

replacing the light scattering means with the photosensitive film; and, using the respective memorised scanning information concurrently to control the pattern of movement of the respective single point scanning devices to thereby maintain the overlap of the second and first illuminating beams.

* * * * *